(12) United States Patent
Lee et al.

(10) Patent No.: US 7,772,910 B2
(45) Date of Patent: Aug. 10, 2010

(54) INTERNAL CLOCK GENERATOR, SYSTEM AND METHOD

(75) Inventors: Chul-Ho Lee, Suwon-si (KR); Jin-Yub Lee, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 26 days.

(21) Appl. No.: 12/045,125

(22) Filed: Mar. 10, 2008

(65) Prior Publication Data

US 2008/0224752 A1    Sep. 18, 2008

(30) Foreign Application Priority Data

Mar. 14, 2007    (KR) .................. 10-2007-0025197

(51) Int. Cl.
*G06F 1/04* (2006.01)
(52) U.S. Cl. .................. 327/291; 327/298; 327/141; 327/407
(58) Field of Classification Search ........... 327/291, 327/298, 299, 142–143, 198, 407–413
See application file for complete search history.

(56) References Cited

U.S. PATENT DOCUMENTS

| 6,807,126 | B2 | 10/2004 | Kiso |
| 7,099,167 | B2 * | 8/2006 | Fujise ........................ 363/62 |
| 7,626,438 | B2 * | 12/2009 | Mari et al. ................. 327/298 |
| 2006/0103436 | A1 * | 5/2006 | Saitou ....................... 327/142 |

FOREIGN PATENT DOCUMENTS

| JP | 04254991 A | 9/1992 |
| JP | 2002150788 | 5/2002 |
| JP | 2002215258 | 7/2002 |
| KR | 1020000008823 A | 2/2000 |
| KR | 1020000015139 A | 3/2000 |
| KR | 1020030058249 A | 7/2003 |
| KR | 1020060068187 | 6/2006 |

* cited by examiner

*Primary Examiner*—Lincoln Donovan
*Assistant Examiner*—Shikha Goyal
(74) *Attorney, Agent, or Firm*—Volentine & Whitt, PLLC (57) ABSTRACT

An internal clock generator, system and method of generating the internal clock are disclosed. The method comprises detecting the level of an operating voltage within the system, comparing the level of the operating voltage to a target voltage level and generating a corresponding detection signal, and selecting between a normal clock and an alternate clock having a period longer than the period of the normal clock in relation to the detection signal and generating an internal clock on the basis of the selection.

10 Claims, 11 Drawing Sheets

Fig. 1

(PRIOR ART)

INTERNAL CLOCK GENERATOR, SYSTEM AND METHOD

CROSS-REFERENCE TO RELATED APPLICATIONS

This U.S. non-provisional patent application claims priority under 35 U.S.C. §119 to Korean Patent Application No. 10-2007-0025197, filed on Mar. 14, 2007, the subject matter of which is hereby incorporated by reference.

BACKGROUND OF THE INVENTION

The present invention relates to an internal clock generator, a system incorporating the internal clock generator, and a related method of generating an internal clock.

Semiconductor memory devices may be generally classified into volatile memory devices, such as dynamic random access memory (DRAM) and static random access memory (SRAM), and non-volatile memory devices, such as programmable read-only memory (PROM), erasable programmable read-only memory (EPROM), electrically erasable programmable read-only memory (EEPROM), and ferroelectric RAM (FRAM).

A volatile memory device loses stored data when power is interrupted, while a non-volatile memory device retains stored data in the absence of applied power. Non-volatile memory, and in particular contemporary flash memory, is widely used as a recording medium in a variety of devices such as computers and consumer electronics which experience a high probability of interrupted power. Flash memory has a number of additional advantages including relatively high programming speed and low power consumption. As a result, flash memory is commonly used to store the code and/or data implementing certain critical software routines and functionality, such as the so-called basic input/output system (BIOS) or boot code.

Thus, it is common for a flash memory device being used for such purposes to include a boot block storing BIOS code, boot code, and/or related password or access routines. The boot block is a flash memory area (e.g., a defined range of data addresses) that host device processor may access upon system initialization. That is, every time a power voltage Vcc is applied to the host device, the processor will access the BIOS code, or boot code, etc., stored in the boot block. Thus, data in the boot block is accessed (i.e., read, erased, updated, and/or programmed) more frequently that other general data blocks in flash memory.

Figure 1:
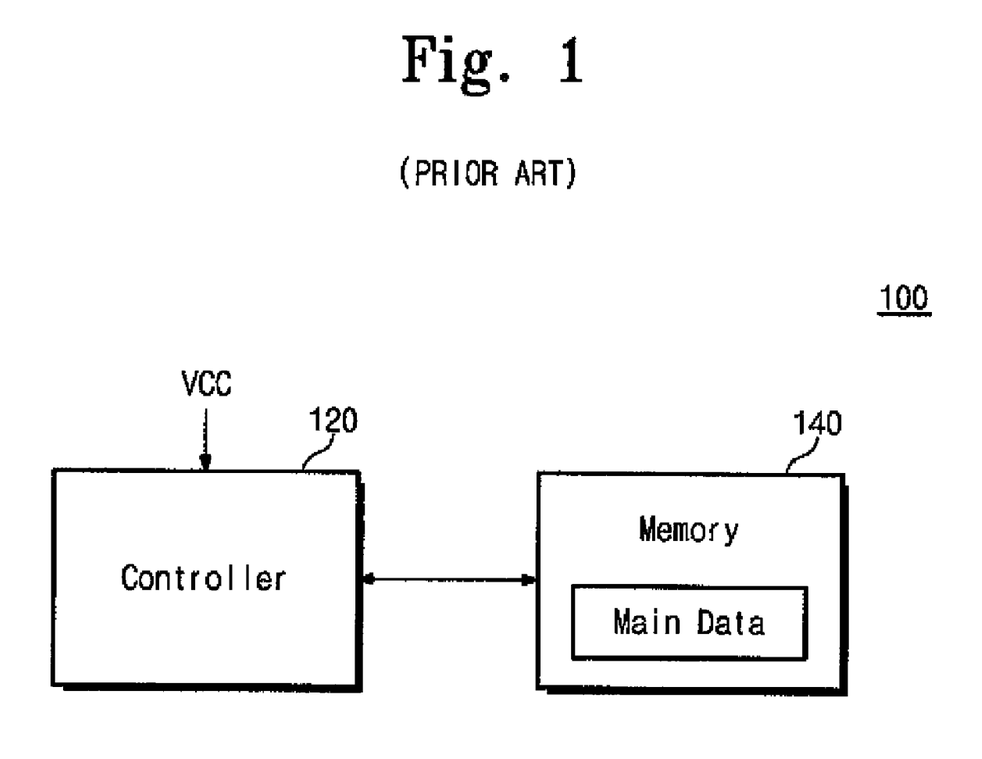
FIG. 1 illustrates a conventional system.

FIG. 1 illustrates a generic conventional system 100. System 100 includes a controller 120 and a memory 140. Memory 140 includes main data stored in a one or more main data blocks. The software routines implemented by the main data may be executed when power voltage VCC is supplied to the host device. However, such software routines can only be run in usual circumstances after the host device has accessed the boot code, operating system (OS) software, and/or BIOS software (hereafter, collectively or singularly referred to as "boot code"). Thus, once power voltage VCC is supplied to system 100, controller 120 accesses the main data stored in memory 140 only after a predetermined initialization period during which boot code is accessed and corresponding host device initialization procedures are executed.

Figure 2:
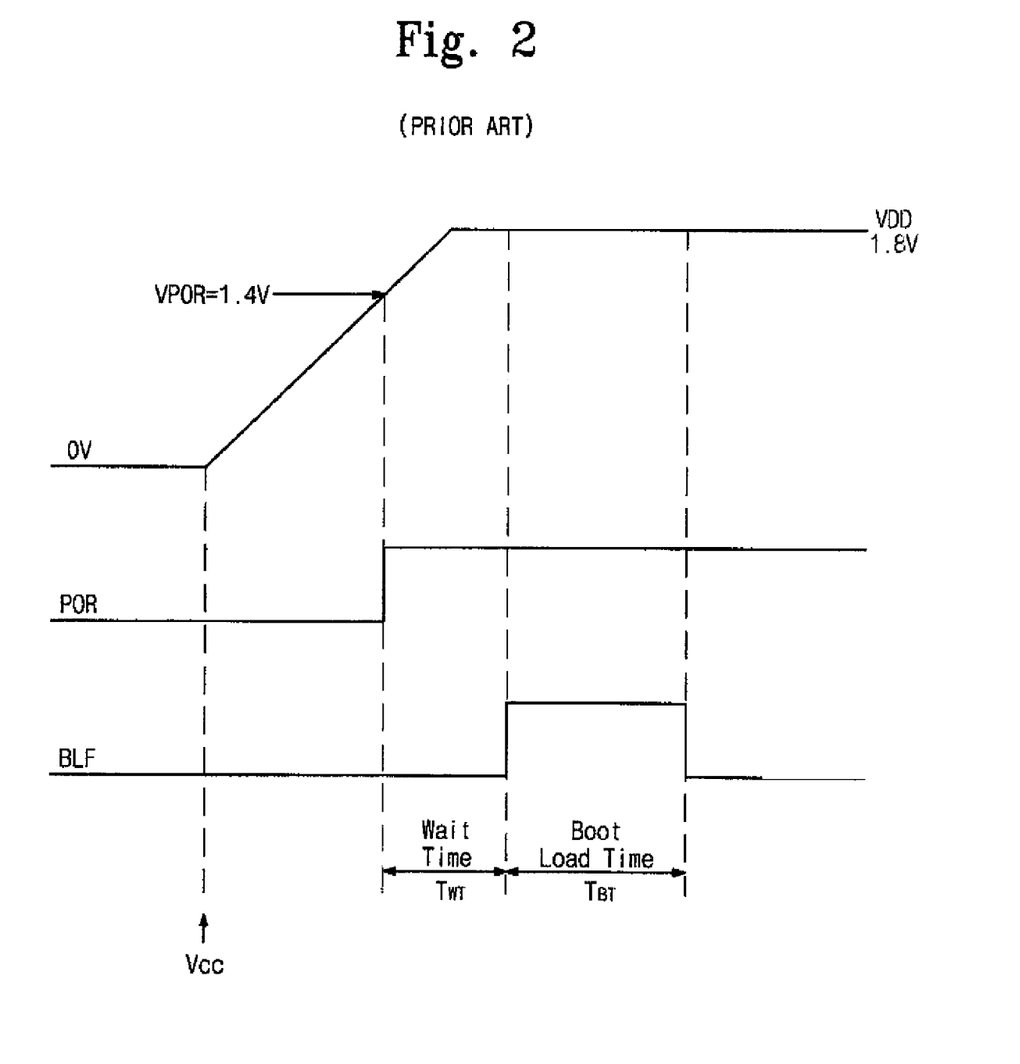
FIG. 2 illustrates one approach to loading boot code in the conventional system.

FIG. 2 illustrates an exemplary approach to the preparation of boot code prior to its being accessed. This "loading" of the boot code begins once power voltage VCC is supplied to system 100. In the illustrated example, system 100 performs boot code loading in response to a power-on reset signal POR actuated following a predetermined wait time $T_{WT}$. The wait time $T_{wt}$ is a period of time necessary to stabilize and verify certain operating voltages (e.g., VDD) within system 100. That is, the power-on reset signal is actuated once the voltage level of certain voltages necessary to the proper operating of internal circuitry in system 100 has been assured.

In the context of the example illustrated in FIG. 2, once Vdd rises from 0V to at least 1.4V, the power-on reset signal (VPOR) is actuated (i.e., transitions from a logically low state to the logically high state, or goes "high"), controller 120 begins generation of an internal clock signal CLK. With the generation of the internal clock CLK, controller 120 may count out the wait time $T_{WT}$. After the wait time $T_{WT}$ has expired, controller 120 actuates a boot load signal BLF during a defined boot load time period $T_{BT}$. Once the boot load signal BLF goes high, controller 120 loads the boot code from memory 140 during the boot load time period $T_{BT}$.

In some cases, it may take a long time to raise the operating voltage VDD of the system 100 up to a target voltage, e.g., 1.8 V.

Figure 3:
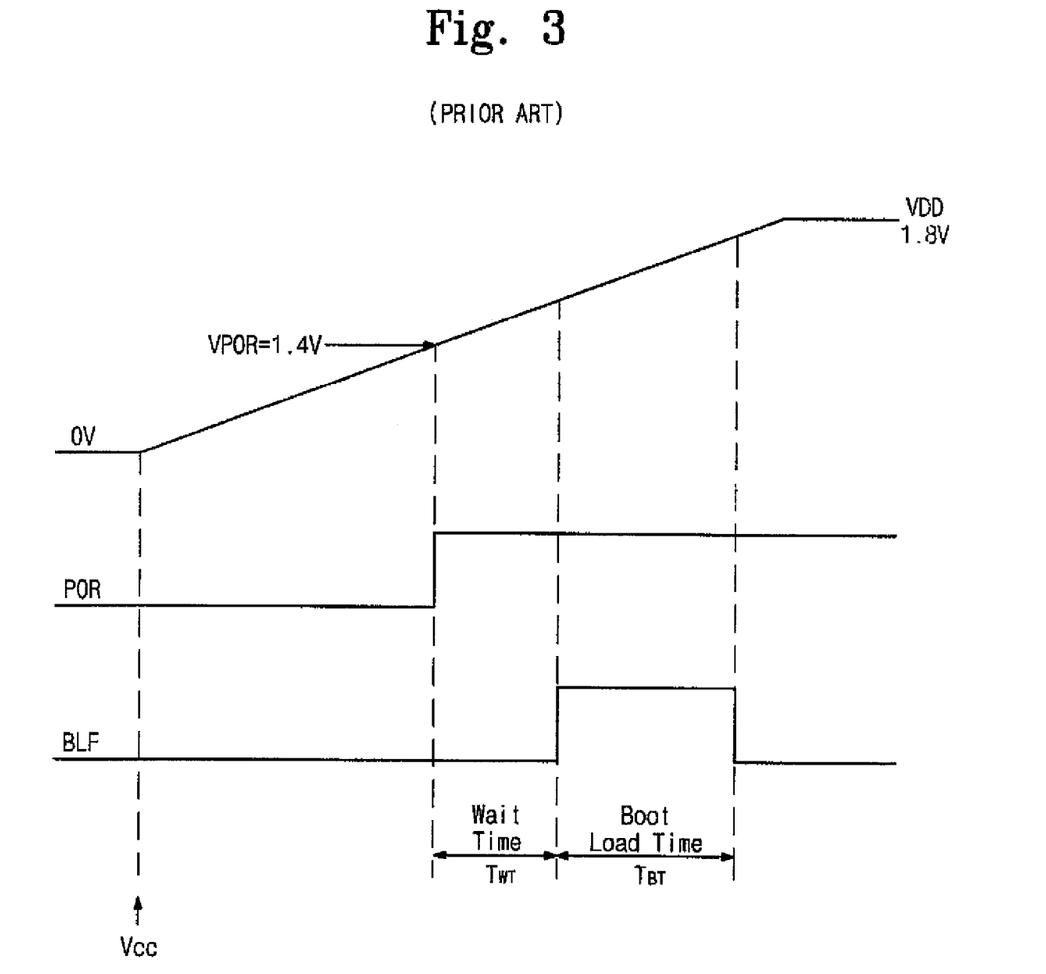
FIG. 3 illustrates a variation of the approach to loading boot code shown in FIG. 2.

FIG. 3 illustrates another example of boot code loading in the conventional system 100. However, unlike the example illustrated in FIG. 2, this example is characterized by a slowly rising operating voltage VDD. In this case, controller 120 must wait considerably longer for the operating voltage VDD to rise to the defined minimum threshold of VPOR=1.4 before initiating the wait time $T_{WT}$. Again, only after expiration of the wait time $T_{WT}$ can system 100 load the boot code during the boot load time $T_{BT}$. However, as shown in FIG. 3, the boot code is loaded before the operating voltage VDD reaches its desired level of 1.8 V. In such a circumstance, the internal circuitry of system 100 may not operate properly Thus, if the operating voltage remains low after the wait time during which the internal clock CLK has been spun up, certain logic circuitry such as data latches, for example, may not operate properly despite the presence of a properly configured internal clock CLK. That is, the spin up of the internal clock CLK and one or more of the operating voltages is poorly synchronized and overall system performance suffers. Indeed, where memory or data latch components used to load the boot code fail under the effects of low operating voltage (s), the boot code loading operating may completely fail.

SUMMARY OF THE INVENTION

Embodiments of the invention provide an internal clock generator, a system incorporating same and a related method of generating an internal clock that prevents a spin-up skew between an operating voltage and the internal clock.

In one embodiment, the invention provides a method of generating an internal clock within a system, the method comprising; detecting the level of an operating voltage within the system, comparing the level of the operating voltage to a target voltage level and generating a corresponding detection signal, and selecting between a normal clock and an alternate clock having a period longer than the period of the normal clock in relation to the detection signal and generating an internal clock on the basis of the selection.

In another embodiment, the invention provides a boot code loading method for use in a system comprising a memory and a controller, the method comprising; detecting the level of an operating voltage within the system, selecting a normal clock as an internal clock signal when the level of the operating voltage is greater than or equal to target voltage level, and selecting an alternate clock as the internal clock when the level of the operating voltage is less than the target voltage level, wherein the normal clock has a shorter period than the alternate clock.

In another embodiment, the invention provides an internal clock generator comprising; a power detector detecting the level of an operating voltage, comparing the detected level of the operating voltage to a target voltage level, and providing a detection signal indicating the result of the comparison, and a clock generator selecting between a normal clock and an alternate clock having a period longer than the normal clock in relation to the detection signal and providing the selection as an internal clock.

In another embodiment, the invention provides a system comprising; a memory storing boot code, and a controller controlling the memory and comprising a clock generator, wherein the clock generator comprises; a power detector detecting the level of an operating voltage, comparing the detected level of the operating voltage to a target voltage level, and providing a detection signal indicating the result of the comparison, a first clock generator generating the normal clock, a second clock generator generating the alternate clock having a period longer than the normal clock, and a multiplexer selecting between the normal clock and the alternate clock in relation to detection signal and providing the selection to the memory as an internal clock controlling a boot code loading process, whereby the boot code is loaded from the memory to the controller.

DESCRIPTION OF EMBODIMENTS

Embodiments of the invention will be described below in more detail with reference to the accompanying drawings. The present invention may, however, be embodied in different forms and should not be construed as being limited to only the illustrated embodiments. Rather, these embodiments are presented as teaching examples.

Embodiments of the invention, including internal clock generators, related systems and methods, provide an internal clock CLK having a period determined in relation to the level of an operating voltage. For example, within certain embodiments of the invention, a "normal" clock NCLK is generated if the level of the operating voltage VDD is greater than or equal to a detection target voltage $V_{DT}$. However, if the level of the operating voltage VDD is less than the level of the detection target voltage $V_{DT}$, an alternate clock ACLK is generated, wherein the alternate clock ACLK has a longer period than that of the normal clock NCLK. Of note, the normal clock generally has a frequency (and a corresponding period) at which the system is intended to run.

Thus, within embodiments of the invention, when the operating voltage VDD is less than the target voltage $V_{DT}$, data may be synchronously latched in relation to the alternate clock ACLK. Accordingly, a skew does not arise between the data to be latched and the latching clock signal. In this context, the term "skew" means a condition wherein the relationship between the data to be latched and the (normal) internal clock NCLK are improperly synchronized such that a data latch operation fails.

Figure 4:
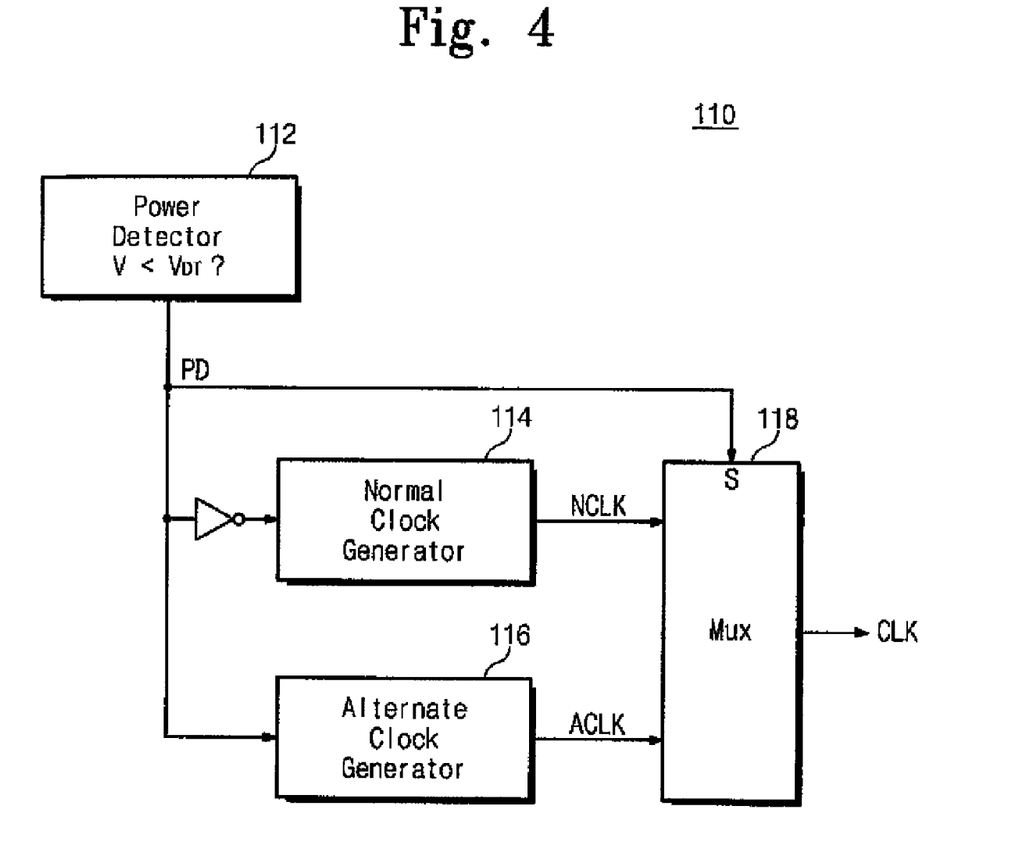
FIG. 4 illustrates an internal clock generator according to an embodiment of the invention.

FIG. 4 illustrates an internal clock generator 110 operable within a system designed in accordance with an embodiment of the invention. Referring to FIG. 4, internal clock generator 110 includes a power detector 112, a normal clock generator 114, an alternate clock generator 116, and a multiplexer 118. Power detector 112 detects the voltage level of operating voltage VDD. Normal clock generator 114 generates the normal clock NCLK and alternate clock generator 116 generates the alternate clock ACLK. Thus, internal clock generator 110 is able to detect the level of operating voltage VDD in order to select a different internal clock CLK source in relation to the detection.

Power detector 112 detects the level of operating voltage VDD in relation to a defined target voltage $V_{DT}$ and generates a high detection signal PD when the voltage level of operating voltage VDD is less than the target voltage $V_{DT}$ or a low detection signal PD when the voltage level of operating voltage VDD is greater than the target voltage $V_{DT}$.

The target voltage $V_{DT}$ may be defined in terms of a minimally acceptable operating voltage VDD level (i.e., an operating voltage VDD level that does not cause a skew between the data to be latched and the applied internal clock CLK. In certain embodiments of the invention, the target voltage $V_{DT}$ will be empirically derived by testing or modeling relevant systems or system components.

In most contemporary host devices, power supply voltages (and related operating voltages) are supplied to a system through a mesh (or grid) of power supply lines. Accordingly, power detector 112 may be placed in any number of locations within the mesh of power supply lines in order to detect the level of operating voltage VDD. The detection alternate signal PD described above may be applied to normal clock generator 114, alternate clock generator 116, and multiplexer 118.

In the illustrated embodiment, normal clock generator 114 generates the normal clock NCLK in response to a low detection alternate signal PD received through an inverter. Alternate clock generator 116 generates the alternate clock ACLK in response to a high detection alternate signal PD. Multiplexer 118 selects one of the normal clock NCLK generated by normal clock generator 114 or the alternate clock ACLK generated by the alternate clock generator 116 in response to the logic level of the detection alternate signal, and provides the selected clock signal as the internal clock CLK of the system.

Alternately, internal clock generator 110 may constantly generate the normal clock NCLK and the alternate clock ACLK regardless of the level of the detection alternate signal PD, and multiplexer 118 may then select between the two clocks in relation to the detection alternate signal PD.

In one embodiment of the invention power detector 112 operates constantly. Alternatively, power detector 112 may be turned ON only during a system initialization period. That is, power detector 112 may operate only for a period of time following application of power to the system.

Figure 5:
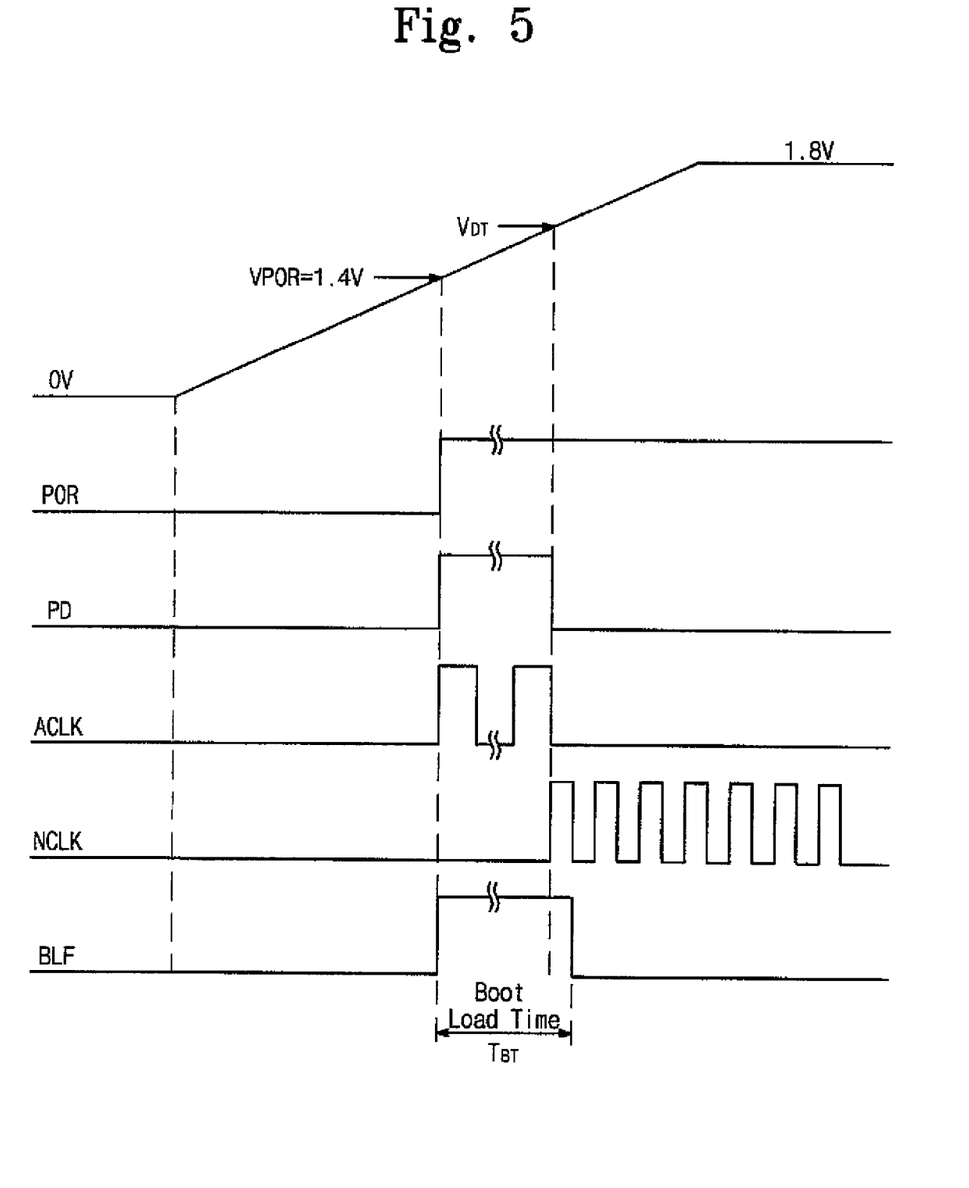
FIG. 5 illustrates a process of initializing a system by using an internal clock generator according to an embodiment of the invention.

FIG. 5 illustrates a process of initializing a system using internal clock generator 110 according to an embodiment of the invention. Referring to FIG. 5, internal clock generator 110 generates a different clock in relation to the detected voltage level of operating voltage VDD.

An exemplary initialization process of the system according to an embodiment of the invention will now be described with reference to FIG. 5. When an externally supplied power voltage VCC is supplied to the system, operating voltage VDD increases gradually. When the operating voltage VDD increases to a power-on reset level (e.g., VPOR=1.4), the system generates a high power-on reset signal POR. All of internal circuits within the system begin operating in response to the power-on reset signal POR. Thus, power detector 112 begins operation. In general, the level of the target voltage $V_{DT}$ should be selected to be higher than a voltage level VPOR of a power-on reset voltage. Accordingly, power detector 112 will generate a low detection signal PD upon beginning operation.

Alternate clock generator 116 is enabled in response the low detection signal PD and generates the alternate clock ACLK. Internal clock generator 110 selects the alternate clock ACLK as the internal clock CLK provided to the internal circuits of the system. At this time, a controller (not shown) within the system generates a high boot load signal BLF to begin loading the boot code from a memory. Thus, the system loads the boot code synchronously with the alternate clock ACLK.

As illustrated in FIG. 5, after actuating the power-on reset signal POR, the level of operating voltage VDD is detected without waiting for the expiration of a predetermined waiting time $T_{WT}$. Instead, the boot load signal BLF is immediately generated to allow boot code loading. This approach notably reduces the overall boot code loading process. That is, the internal clock CLK provided by internal clock generator 110 may be used to immediately detect the level of the operating voltage VDD. As long as the detected level of the operating voltage VDD is less than the target voltage $V_{DT}$, internal clock generator 110 selects and uses the alternate clock ACLK as the internal clock CLK. However, once detected level of the operating voltage VDD is greater than or equal to the level of the target voltage $V_{DT}$, internal clock generator 110 selects and uses the normal clock NCLK as the internal clock.

In fact, the boot loading process may be completed before the operating voltage VDD rises above the level of the target voltage $V_{DT}$. In other cases, the boot code will continue loading after the operating voltage VDD has risen to or above the level of the target voltage $V_{DT}$.

If the voltage level of the operating voltage VDD is greater than or equal to the level of the target voltage $V_{DT}$, power detector 112 generates a low detection signal PD and normal clock generator 114 will be enabled to generate a normal clock NCLK. Accordingly, internal clock generator 110 may provide the normal clock NCLK as the internal clock CLK of the system under this condition. Thus, loading of the boot code may first proceed synchronously with the alternate clock ALCK before the operating voltage VDD becomes greater than or equal to the level of the target voltage $V_{DT}$, but may then proceed synchronously with the normal clock CLK once the voltage level of the operating voltage VDD becomes greater than or equal to target voltage $V_{DT}$.

Figure 6:
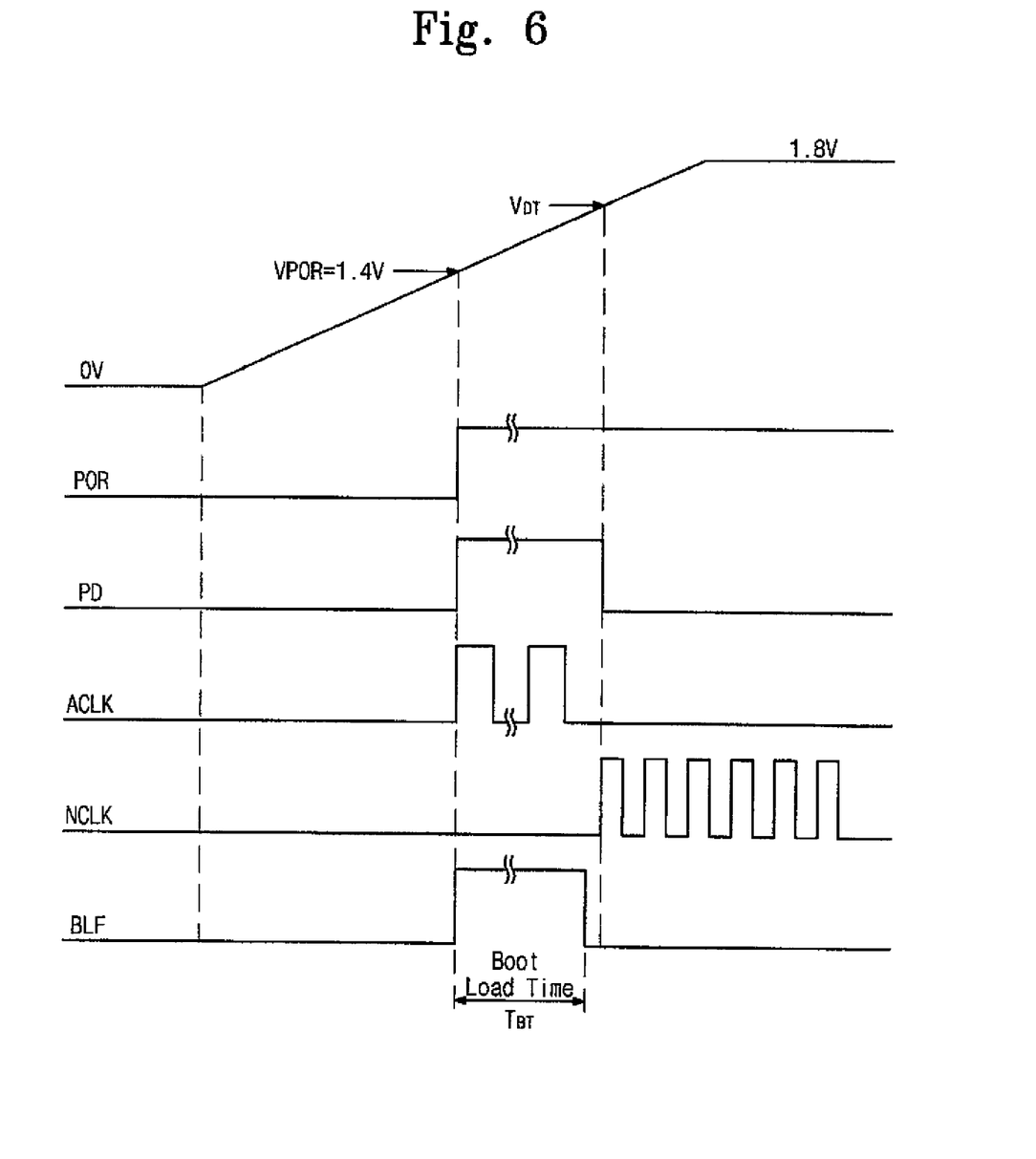
FIG. 6 illustrates an initializing process of a system including an internal clock generator when power is slowly supplied, according to an embodiment of the invention.

FIG. 6 illustrates an initialization process for a system including the internal clock generator according to an embodiment of the invention. However, the ramp up of the power supply voltage in this embodiment is assumed to be slower than in the previous embodiment. Referring to FIG. 6, internal clock generator 110 again detects the level of the operating voltage VDD. If the level of the operating voltage VDD is less than the level of the target voltage $V_{DT}$, internal clock generator 110 selects the alternate clock ACLK as the internal clock CLK. Hence, the system loads the boot code synchronously with the alternate clock ACLK which has a longer period (lower frequency) than the normal clock NCLK. In fact, to ensure more stable boot code loading, internal clock generator 110 in the embodiment of FIG. 6 delays the generation of the normal clock NCLK until after the boot code has finished loading. That is, internal clock generator 100 may generate the normal clock NCLK only after the boot load signal BLF returns to low.

Figure 7:
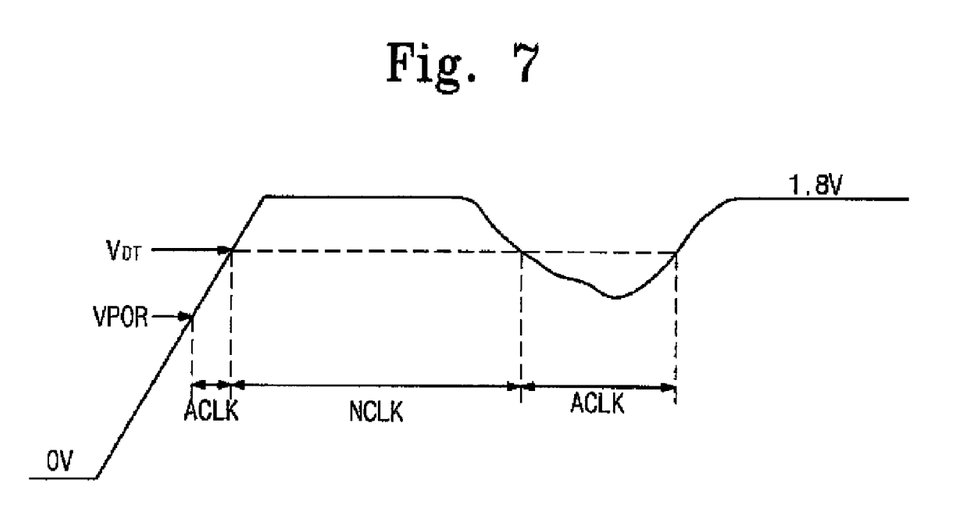
FIG. 7 illustrates an internal clock generated according to a level of an operating voltage.

FIG. 7 illustrates another approach to the generation of an internal clock CLK in accordance with the level of the operating voltage VDD. Until the level of the operating voltage VDD equals or exceeds the level of the target voltage $V_{DT}$, internal clock generator 110 selects the alternate clock ACLK as the internal clock CLK. Once the level of the operating voltage VDD equals or exceeds the level of the target voltage $V_{DT}$, however, internal clock generator 110 selects the normal clock NCLK as an internal clock CLK. However, should the level of the operating voltage VDD fall below the target voltage $V_{DT}$, internal clock generator 110 again selects the alternate clock ACLK as the internal clock CLK.

Figure 8:
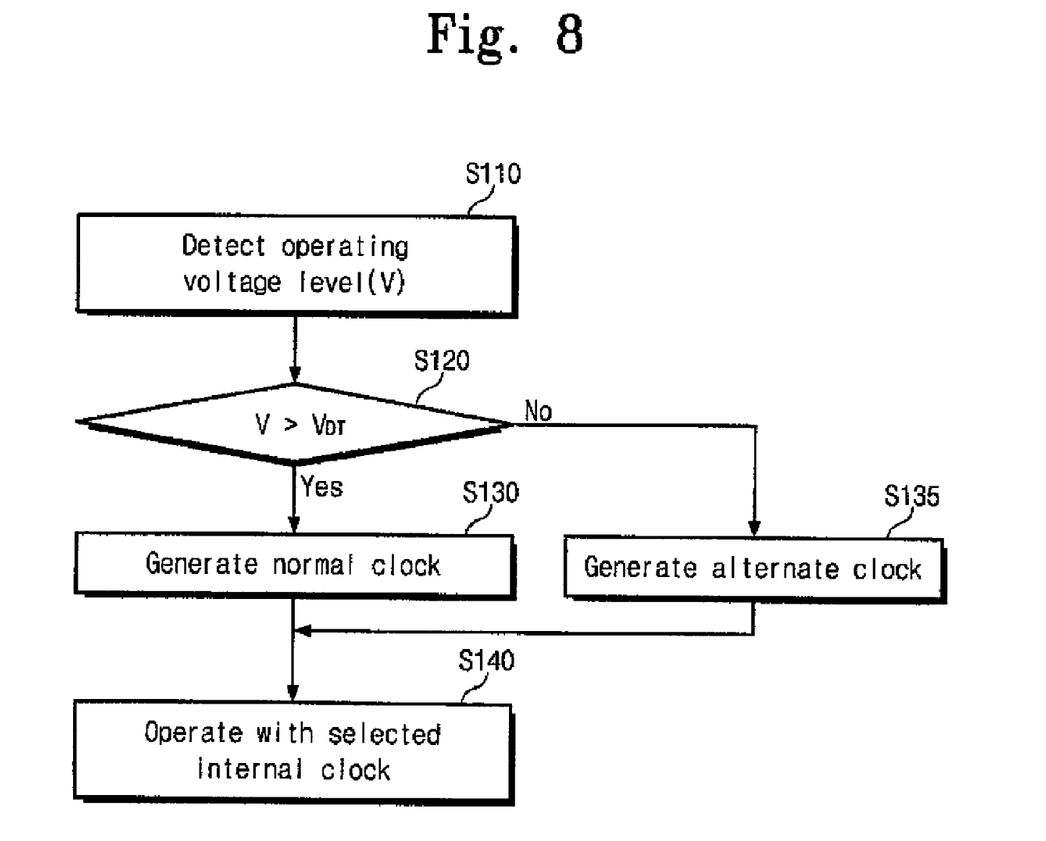
FIG. 8 illustrates an internal clock generating method of a system according to an embodiment of the invention.

FIG. 8 is a flowchart summarizing a method of generating an internal clock in a system according to an embodiment of the invention.

First, power detector 112 of internal voltage generator 110 detects the level of the operating voltage VDD (S110). This determination may be made (YES/NO) with respect to the level of a target voltage $V_{DT}$ (S120). In response to this determination, power detector 112 generates a detection signal PD.

Where the detection signal PD indicates that the level of the operating voltage VDD is greater than or equal to the level of the target voltage $V_{DT}$ (S120=YES), internal clock generator 110 selects and outputs (i.e., generates) the normal clock NCLK (S130). However, where the detection signal PD indicates that the level of the operating voltage VDD is less than the level of the target voltage $V_{DT}$, internal clock generator 110 generates the alternate clock ACLK. The system then operates in accordance with either the normal clock signal NCLK or the alternate clock signal ACLK as the internal clock CLK (S140).

Figure 9:
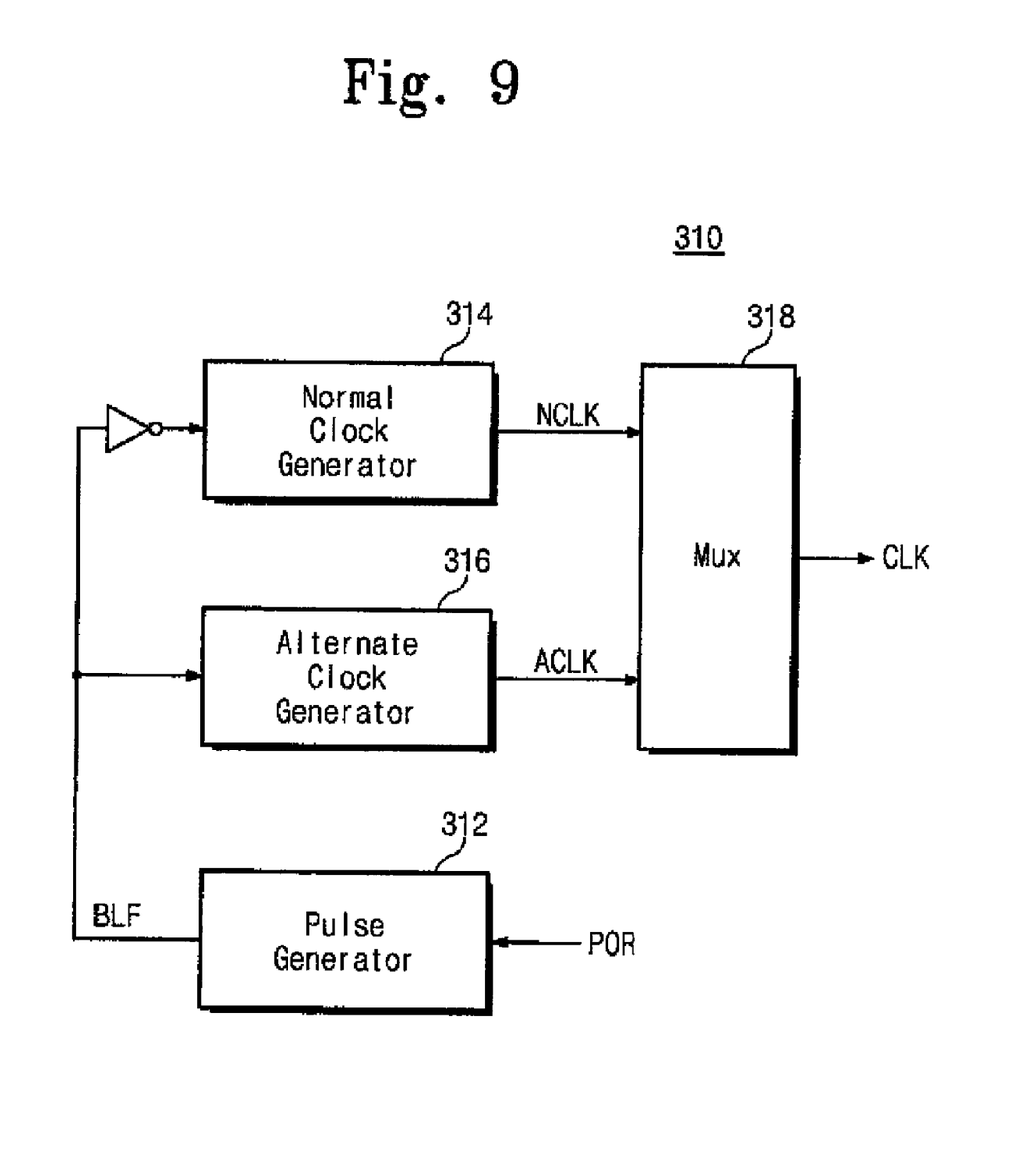
FIG. 9 illustrates an internal clock generator according to another embodiment of the invention.

FIG. 9 illustrates an internal clock generator 310 for a system according to another embodiment of the invention. Referring to FIG. 9, internal clock generator 310 includes a pulse generator 312, a normal clock generator 314, an alternate clock generator 316, and a multiplexer 318. Internal clock generator 310 selects and outputs (i.e., generates) an internal clock CLK in response to the boot load signal BLF. Pulse generator 312 generates a high boot load signal BLF during the predetermined boot load time $T_{BT}$ following a predetermined time $T_{WT}$, in response to a power-on reset signal POR.

Internal clock generator 310, according to a current embodiment of the present invention, allows a system to operate in synchronously with the alternate clock ACLK generated by alternate clock generator 316 during the boot load time $T_{BT}$.

Figure 10:
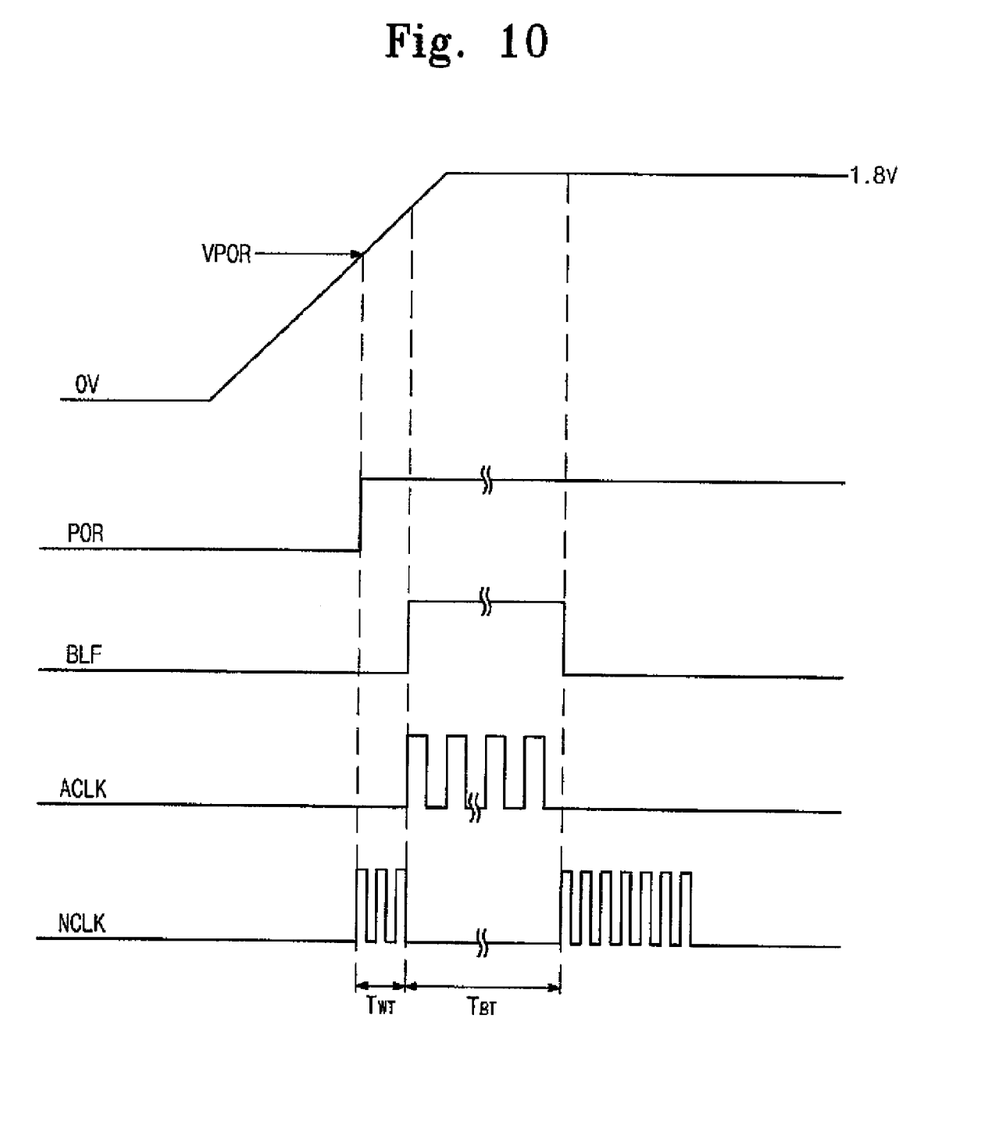
FIG. 10 illustrates a boot code loading process of a system using the internal clock generator of FIG. 9.

FIG. 10 illustrates an exemplary approach to boot code loading using the system of FIG. 9.

Referring to FIGS. 9 and 10, when the operating voltage VDD becomes greater than or equal to the power-on reset voltage level VPOR, the memory controller generates a high power-on reset signal POR. The internal circuitry of the system begins operation in response to the power-on reset signal POR. At this time, the boot load signal BLF remains low for a predetermined period of time. Normal clock generator 314 is enabled in response to the low boot load signal BLF to generate the normal clock NCLK and the system operates using the normal clock NCLK as the internal clock CLK.

Following the predetermined waiting time $T_{WT}$, the system generates a high boot load signal BLF to begin the boot code loading process. The alternate clock generator 316 is enabled in response to the high boot load signal BLF to generate the alternate clock ACLK and the system operates using the alternate clock ACLK as the internal clock CLK. The system loads the boot code from memory during the boot load time $T_{BT}$ synchronously with the alternate clock ACLK.

After the boot code loading process is complete, the boot code signal BLF goes low again. Then, the alternate clock generator 316 is disabled in response to the low boot load signal BLF, while the normal clock generator 314 is enabled. Accordingly, following the boot code loading process, the system operates in response to the normal clock NCLK.

Thus, a system according to an embodiment of the invention may use the alternate clock ACLK only during a boot code loading process. In this manner, the system prevents boot-code loading from failing due to a skew caused between the data to be loaded and the clock used to load the data during an initialization period of the system.

Figure 11:
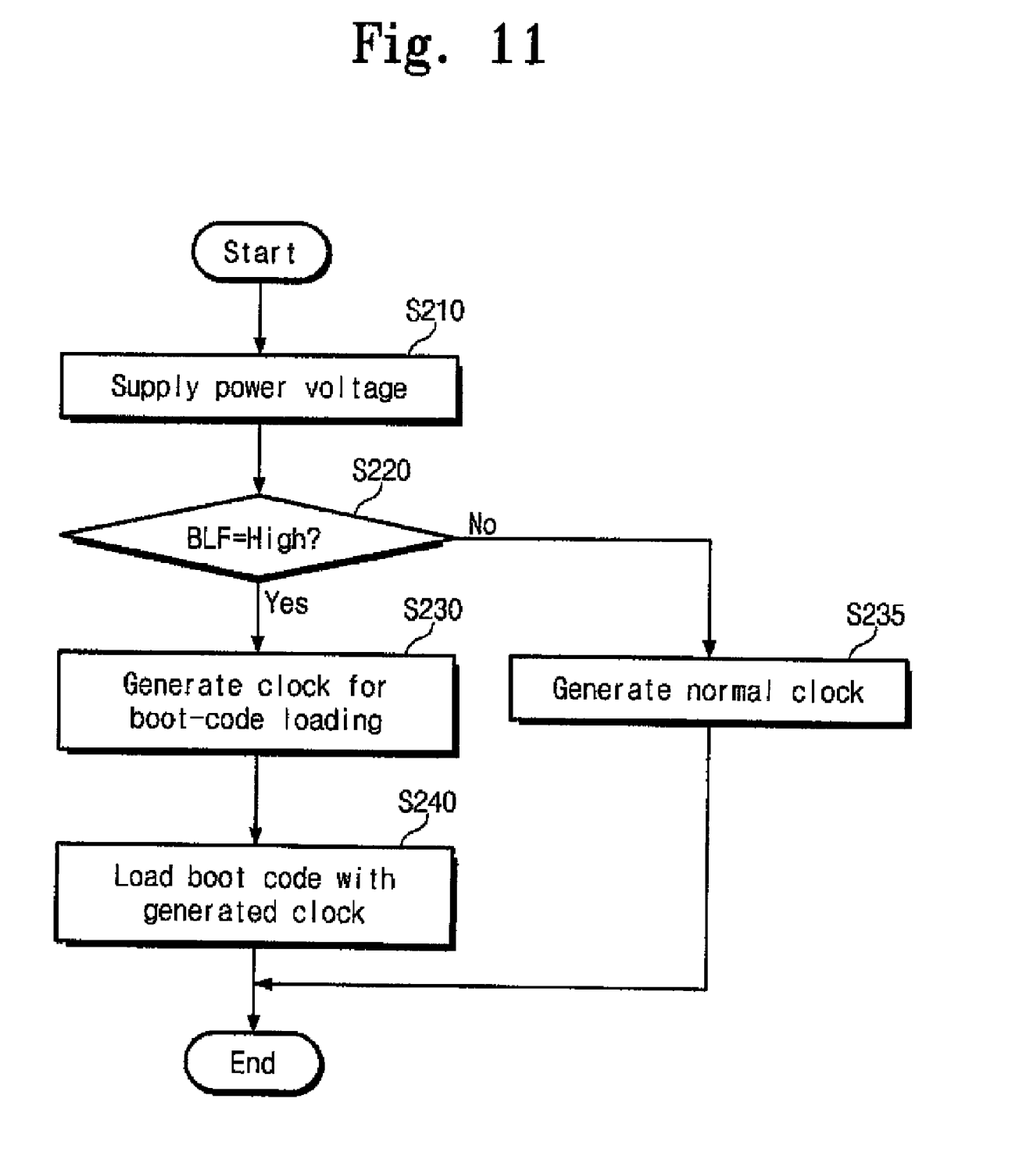
FIG. 11 illustrates a boot loading method of a system including the internal clock generator of FIG. 9.

FIG. 11 is a flowchart of a boot loading process capable of being executed by a system including the internal clock generator 310 of FIG. 9.

With reference to FIGS. 9, 10 and 11, a power supply voltage VCC is provided to the system (S210), and a corresponding operating voltage VDD gradually increases. When the operating voltage VDD increases up to a power-on reset voltage level (e.g., VPOR=1.4), the system generates a high power-on reset signal POR. The internal circuitry of the system begins to operate in response to high power-on reset signal POR. After a predetermined waiting time $T_{WT}$, the system generates a high boot load signal BLF to begin loading boot code from memory. That is, it is determined whether the boot load signal BLF is a low or high (S220).

If the boot load signal BLF is high (S220=YES), the internal clock generator 310 generates the alternate clock ACLK as the internal clock CLK (S230), and the system loads boot code from memory during the predetermined boot load time $T_{BT}$ synchronously with the alternate clock ACLK (S240). Else, if the boot load signal BLF is low (S220=NO), the internal clock generator 310 generates the normal clock NCLK as the internal clock CLK.

Embodiments of the invention provide an internal clock generator, a system incorporating the same, and related methods for generating an internal clock which may have a different period in relation to the level of an operating voltage. In such a manner, skew is prevented from occurring between the loaded boot code and the clock enabling the boot code loading process.

Thus, the internal clock generator according to embodiments of the invention is applicable to any system including a logic circuit latching data synchronous with an internal clock.

In general, the internal clock generator may be included in a system controller, such as a memory system controller for example, but the present invention is not limited thereto. The internal clock generator may be disposed outside the controller.

The above-disclosed subject matter is to be considered illustrative, and not restrictive, and the appended claims are intended to cover all such modifications, enhancements, and other embodiments, which fall within the scope of the invention. Thus, to the maximum extent allowed by law, the scope of the present invention is to be determined by the broadest permissible interpretation of the following claims and their equivalents.

What is claimed is:

1. A method of generating an internal clock within a memory system comprising a memory and a controller, the method comprising:

storing boot code in the memory, wherein the boot code is accessed through the controller by an external host device during a power-on routine;

upon receiving a power-on reset signal in the controller during the power-on routine, generating a boot load signal, wherein the boot load signal immediately transitions from a non-active state to an active state in response to the power-on reset signal, remains in the active state during a boot load time period during which the controller accesses the boot code in the memory, and following the boot load time period transitions from the active state to the inactive state; and operating the memory system synchronously with an alternate clock signal during the boot load time period and synchronously with a normal clock signal following the boot load time period.

2. The method of claim 1, wherein the inactive state of the boot load signal is low, and the active state of the boot load signal in high.

3. The method of claim 1, wherein the alternate clock runs at a slower frequency than the normal clock.

4. A boot code loading method for use in a memory system comprising a memory and a controller, wherein the boot code is stored in the memory, the method comprising:

receiving a power-on reset signal in the controller from an external device during a power-on routine, wherein the boot code is loaded from the memory by the controller during the power-on routine;

upon receiving the power-on reset signal in the controller, immediately generating a boot load signal, wherein the boot load signal transitions from a non-active state to an active state in response to the power-on reset signal, remains in the active state during a boot load time period during which the controller accesses the boot code in the memory, and following the boot load time period transitions from the active state to the inactive state;

separately generating a normal clock signal and an alternate clock signal having frequency lower than the normal clock signal;

selecting the normal clock as an internal clock signal when the boot load signal is non-active; and selecting the alternate clock as the internal clock when the boot load signal is active; and operating the memory system synchronously with the internal clock.

5. The method of claim 4, further comprising:

generating the power-on reset signal when the level of an operating voltage applied to the memory system exceeds a threshold level less than a target voltage level at which the memory system is normally operated, wherein the normal clock is selected as the internal clock when the operating voltage rises to the target voltage level.

6. The method of claim 5, wherein the normal clock is only selected following expiration of the boot load time.

7. The method of claim 4, wherein the boot load time period comprises a first period during which the boot code is loaded from the memory to the controller synchronously with the alternate clock and a second period following the first period during which the boot code is loaded from the memory to the controller synchronously with the normal clock.

8. The method of claim 4, wherein the boot code is loaded from the memory to the controller synchronously with only the alternate clock.

9. A method of generating an internal clock within a memory system comprising a controller and a memory, the method comprising:

- generating a boot load signal immediately in response to a power-on reset signal received by the controller during a power-on routine during which an external device accesses boot code stored in the memory, wherein the boot load signal is active during only a boot load time;
- detecting a level of an operating voltage applied to the memory system;
- comparing the detected level of the operating voltage to a target voltage level at which the memory system is normally operated;
- generating an alternate clock during the boot load time in response to the received boot load signal and during a period in which the level of the operating voltage is less than the target voltage level;
- generating a normal clock having a period shorter than the alternate clock when the level the operating voltage is greater than or equal to the target voltage level; and
- synchronously operating the memory system in relation to the alternate clock during at least a portion of the boot load time, and synchronously operating the memory system in relation to the normal clock once the level the operating voltage is greater than or equal to the target voltage level.

10. A method of operating a memory system synchronously with an internal clock, the memory system comprising a controller and a memory, and the method comprising:

- generating a boot load signal immediately in response to a power-on reset signal received by the controller during a power-on routine during which an external device accesses boot code stored in the memory, wherein the boot load signal is active during only a boot load time;
- detecting a level of an operating voltage applied to the memory system, wherein the memory system is normally operated only when the operating voltage rises to a target voltage level;
- during at least a portion of the boot load time and before the operating voltage rises to the target voltage level, selecting an alternate clock as the internal clock; and
- once the operating voltage reaches the target voltage level, selecting a normal clock having a higher frequency than the alternate clock as the internal clock.

\* \* \* \* \*